Patented Feb. 8, 1944

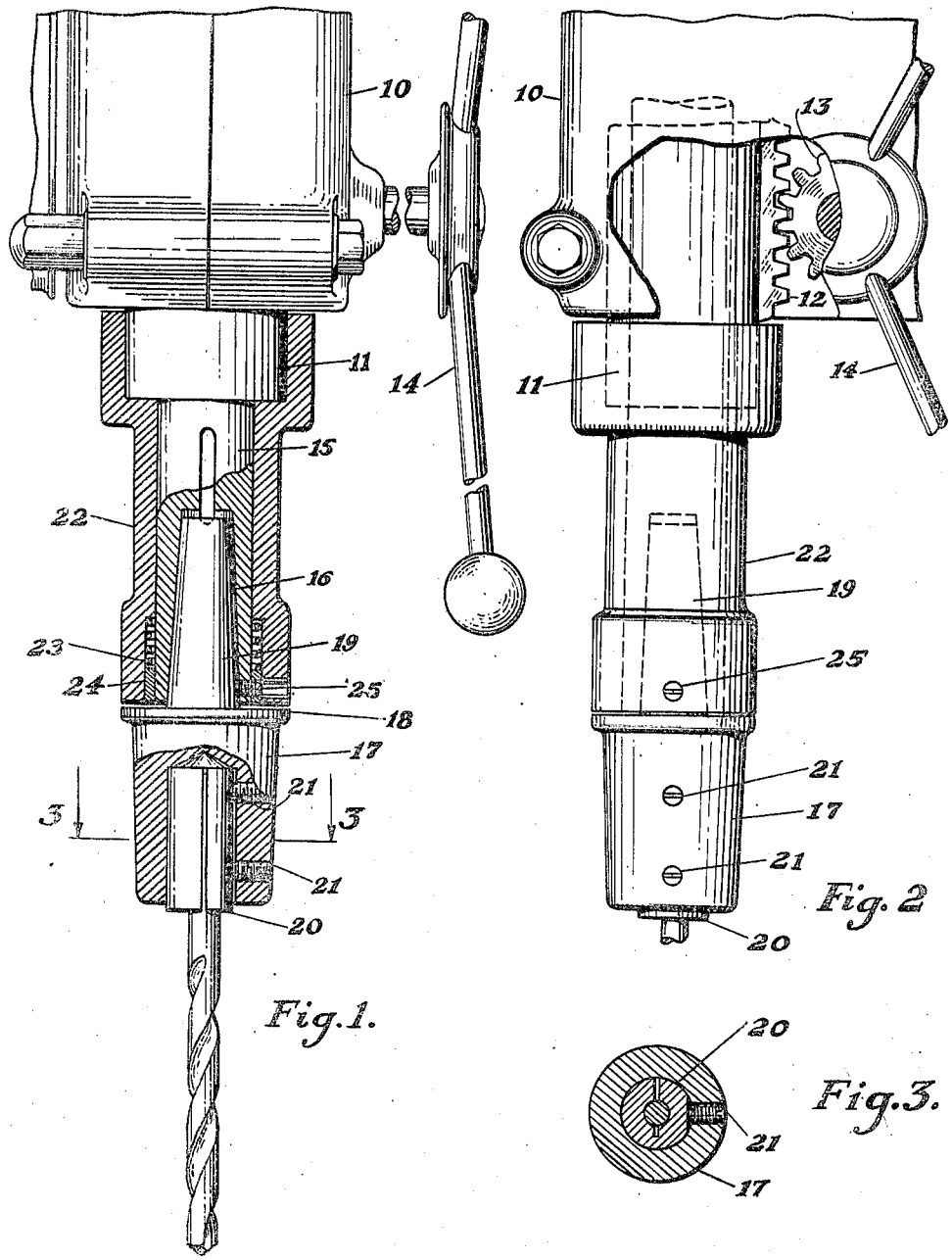

2,341,051

UNITED STATES PATENT OFFICE 2,341,051

TOOL SUPPORTING AND EJECTING STRUCTURE

Peter Lustrik, Cleveland, Ohio

Application August 29, 1942, Serial No. 456,658

4 Claims. (Cl. 77—55)

This invention relates broadly to chucks for machines of the type that are formed for the reception of taper shank tools and more specifically to tool supporting structures which will accommodate the engagement and ejection of the tool holder while the machine is running.

The objects of the invention contemplate the provision of a holder which is designed to facilitate the support of tools of various size and form, the provision of a structure which will facilitate the ready securement of such tools within the holder, the provision of an adapter which will assure the coaxial alignment of the tool with the tapered socket in the machine spindle and the provision of a thrust member which is constructed to break the seized engagement between the tapered shank of the holder and the socket during the retractive movement of the spindle.

Further objects of the invention reside in the provision of a tool supporting and ejecting structure which may be used without hazard of injury to the operator, a tool which is economic of manufacture and an ejector which is unimpaired by loss in size resulting from wear.

Other objects and advantages more or less ancillary to the foregoing and the manner in which all the various objects are realized will appear in the following description, which considered in connection with the accompanying drawing, sets forth the preferred embodiment of the invention.

Referring to the drawing:

Fig. 1 is a vertical sectional view through the improved tool holder and ejector including, in elevation, a fragmentary portion of the head of a drill press;

Fig. 2 is an elevation of the tool holder and ejector illustrated in Fig. 1 as viewed at right angles thereto, a portion of the drill head housing being broken away in the interest of clarity; and Fig. 3 is a transverse section through the tool holder, the section being taken on a plane indicated by the line 3—3 in Fig. 1.

As will be seen in Fig. 2 the drill press, which is chosen herein as merely illustrative of one of the types of machines which will accommodate the use of the improved tool, embodies a housing 10 having a quill 11 therein mounted for reciprocative movement by the rack 12 and pinion 13 actuated through a hand lever 14. The quill 11 is bored for the reception of a rotatively driven spindle 15 movable with the quill and having a taper socket 16 of standard form in the free end thereof.

The improved tool holder comprises a cylindrical body 17 formed with a shoulder 18 in one end thereof and a shank 19 extended therefrom tapered for frictional engagement with the socket 16. The opposed end of the body 17 is bored for the reception of a split bushing 20 drilled and reamed to facilitate the support of the shank of a drill, reamer or other cutting tool. Obviously, the bore in the body 17 may be varied to accommodate bushings of various size and the bushings in turn may be machined to support tools of different size and form. The body of the tool holder is drilled and tapped for the reception of set screws 21 to facilitate the impinged retention of the tool within the bushing.

The tool further comprises an ejecting sleeve 22 which is formed for free telescopic engagement with the spindle 15 and also with the end portion of the quill 11 when the organization of the machine parts warrant such structure. The diameter of the lower end of the sleeve 22 is substantially equal to the diameter of the shouldered portion of the body 17, the upper end of the sleeve being constructed with a wall thickness of sufficient size to withstand abutting engagement with the lower face of the housing 10. The sleeve 22 is supported upon the spindle 15 by a spring 23 mounted within a counterbored recess in the end of the sleeve and retained therein by a collar 24 secured upon the spindle by a screw 25. The sleeve is constructed to facilitate the arrangement of the end portion thereof in flush relation with the end of the spindle so that free access may be had to the socket 16, while the spindle is being rotated. The sleeve is further constructed so that the upper end thereof will engage the head of the machine or a fixed member thereon before the quill reaches the end of its retractive stroke.

It will be recognized that with the sleeve arranged in the manner described above the shank 19 of the tool holder may be thrust into the socket 16 and operatively engaged thereby while the spindle is rotating. It will further be seen that when the tool holder is in place and while the spindle is rotating the quill of the machine may be elevated by actuation of the lever 14 until the ends of the sleeve 22 are engaged respectively with the head of the machine and the shoulder 18 on the tool holder. Continued retraction of the quill by further pressure upon the lever will force the lower end of the sleeve against the shoulder 18 and thus break the seized engagement of the taper shank with the socket.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A tool supporting and ejecting structure comprising a tool holder, a taper shank thereon formed for engagement with the taper socket in the spindle of a machine tool, an annular shoulder on the tool holder adjacent the large end of said taper shank, a sleeve formed for sliding engagement upon the spindle of the machine, the ends of said sleeve being engageable respectively with a fixed portion of the machine and said shoulder on the tool holder upon retraction of the spindle.

2. In combination with a machine tool embodying a fixed head, and a rotative retractible spindle having a taper socket in the end thereof, a tool supporting and ejecting structure therefor comprising a holder for the support of a cutting tool, a taper shank on said holder engageable with the tapered socket in the spindle, an enlarged head defining a shoulder on the opposed end of said holder, a sleeve resiliently supported upon the spindle, the ends of said sleeve being engageable with the fixed head of the machine and the shoulder on said holder during the retraction of the spindle.

3. In a drill press embodying a head, a rotatable and vertically movable spindle therein having a tapered socket in the end thereof, a structure for supporting and ejecting a cutting tool during the rotative movement of the spindle, comprising a tool clamping body, a taper shank thereon engageable in said socket, a shoulder on said body adjacent said shank, a collar affixed to the end of said spindle, a sleeve telescopically engaged with said collar and said spindle, said sleeve having a counterbore in one end thereof defining a ledge, a spring intermediate said ledge and said collar, said sleeve being arranged for abutting engagement with the head of the machine and the shoulder on said holder when the spindle is moved vertically upward.

4. In combination with a drill press embodying a head, a reciprocative quill, a rotary spindle therein movable therewith and having a tapered socket therein, a tool holding and ejecting structure comprising a body, means thereon for clamping a cutting tool, a taper shank on said body engageable with said socket, a collar on the end of said spindle, a spring on said spindle seated on said collar, a sleeve surrounding a portion of said spindle and quill and seated on said spring, the ends of said sleeve being of diameter at least equal to the dimensions of the head and diameter of the body, said sleeve being arranged for impinged engagement between the head and said body during the upward movement of the quill.

PETER LUSTRIK.